Oct. 23, 1962  J. B. GODSHALK ET AL  3,060,375
CONDUCTIVITY PROBE FOR STORAGE BATTERY TESTERS
Filed April 4, 1960
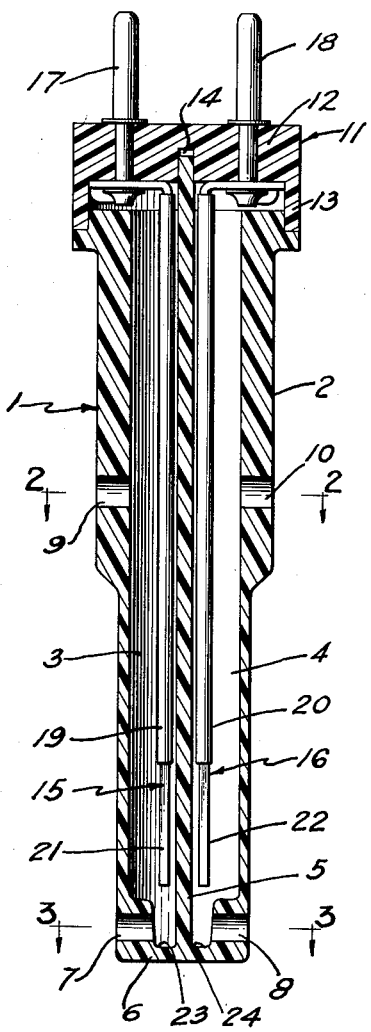
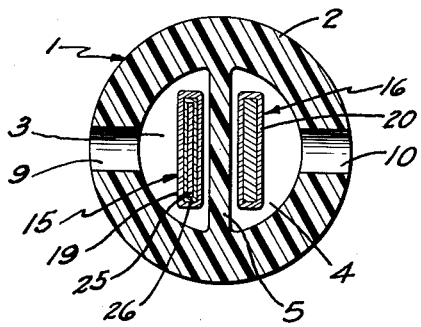
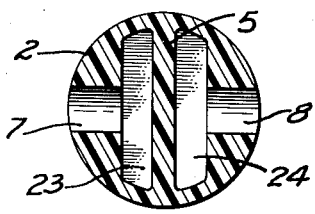
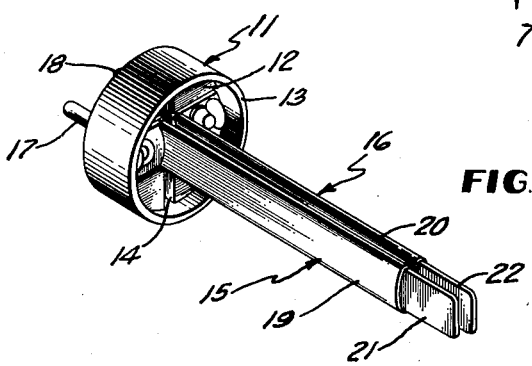
INVENTORS
JAMES B. GODSHALK
LEWIS A. MEDLAR
BY
ATTORNEY United States Patent Office 3,060,375
Patented Oct. 23, 1962

3,060,375
CONDUCTIVITY PROBE FOR STORAGE
BATTERY TESTERS
James B. Godshalk, West Pikeland Township, Chester County, and Lewis A. Medlar, Oreland, Pa., assignors to Fox Products Company, Philadelphia, Pa., a corporation of Pennsylvania
Filed Apr. 4, 1960, Ser. No. 19,576
6 Claims. (Cl. 324—29.5)

This invention relates to battery testers and particularly to conductivity probes for storage battery testers of the cell comparison type, to electrodes for such probes, and to a method for making such electrodes.

In United States patent application Serial Number 19,573, filed concurrently herewith by Louis N. Strain, there is described and claimed a storage battery tester comprising both means for determining the overall state of charge of the battery and means for comparing the conditions of the cells of the battery by determining the conductivity of the electrolyte in each cell. In accordance with said copending application, the cell comparison is made by inserting a conductivity probe via the filling openings of the cells, the probe comprising negative and positive electrodes exposed to the electrolyte and connected in a circuit comprising a current source and a voltmeter in series.

In such an apparatus, acceptable accuracy depends in part upon the nature and arrangement of the negative electrode, since cell electrolyte conductivity readings are not ordinarily completed before evolution of hydrogen gas at the surface of the negative electrode occurs and irregular hydrogen bubble formation and release results in an unstable electrode current. The manner in which hydrogen bubbles form on and are released from the surface of the electrode depends upon the physical characteristics of the electrode surface. Hence, it is important that the electrodes have desirable surface characteristics when first installed and that these characteristics be retained throughout the useful life of the electrode.

A general object of the present invention is to provide an effective conductivity probe for battery testers of the type described.

Another object is to devise a conductivity probe in such manner that the formation of hydrogen bubbles on the electrode surfaces during use of the probe, and the release of hydrogen bubbles from the electrode surfaces, are sufficiently uniform to allow meaningful all electrolyte conductivity tests to be made.

A further object is to provide a method for making a novel and useful negative electrode for conductivity probes of the type referred to above.

Yet another object is to devise a simple and relatively inexpensive conductivity probe which will maintain its desirable operating characteristics for long periods of use.

In order that the manner in which these and other objects are attained in accordance with the invention can be understood in detail, reference is had to the accompanying drawings, which form a part of this specification, and wherein:

FIG. 1 is a longitudinal sectional view, with some parts shown in elevation, of a conductivity probe constructed in accordance with one embodiment of the invention;

FIGS. 2 and 3 are transverse sectional views taken on lines 2—2 and 3—3, FIG. 1, respectively, enlarged in scale, and FIG. 4 is a perspective view of the electrode assembly of the probe shown in FIG. 1.

Referring now to the drawings in detail, it will be seen that the embodiment of the invention illustrated is a probe unit indicated generally at 1 and comprising an elongated generally cylindrical hollow casing 2 molded from acid-resistant electrical insulating material. The interior of the casing is divided into two longitudinally extending electrode-receiving chambers 3 and 4 by an integrally formed partition 5. At the tip of the casing, both chambers 3 and 4 are closed by an end wall 6 integral with partition 5 and the outer cylindrical wall of the casing. Adjacent end wall 6, the outer wall of the casing is provided with a pair of diametrically opposed electrolyte entrance ports 7 and 8, port 7 opening into chamber 3 and port 8 opening into chamber 4. At points spaced considerably from end wall 6, the outer wall of the casing is provided with a pair of diametrically opposed gas outlet ports 9 and 10 communicating with chambers 3 and 4, respectively.

The end of casing 2 opposite end wall 6 is closed by a cap 11, of electrical insulating material, the cap having a generally cup-like form provided with a relatively thick transverse wall 12 and a thinner cylindrical skirt 13, the latter embracing the end of the cylindrical casing wall and being rigidly secured thereto in fluid-tight relation by a suitable cement. At this end of the casing, partition 5 projects beyond the end of the outer casing wall and is received in a diametrically extending groove 14 provided in the face of transverse wall 12 of cap 11.

As best seen in FIGS. 1 and 4, cap 11 carries a pair of elongated electrodes 15 and 16, each electrode having a laterally offset end portion seated against the face of the transverse wall 12 of the cap and secured thereto by a combined mounting and electrical connecting pin. Thus, electrode 15 is secured in place by pin 17 and electrode 16 by pin 18. The pins 17 and 18 project from the outer face of cap 11 and are adapted to cooperate with a suitable conventional electrical connector socket (not shown) to connect electrodes 15 and 16 to the electrical circuit of the battery tester in such fashion that electrode 15 is the negative electrode and electrode 16 is the positive electrode.

Electrodes 15 and 16 are identical in dimension and shape, each being relatively thin and having the plan form of a greatly elongated rectangle. The electrodes are so disposed on cap 11 that they project therefrom in parallel relation, the negative electrode 15 extending within chamber 3 to a point adjacent inlet port 7, positive electrode 16 extending within chamber 4 to a point adjacent inlet port 8. The two electrodes are spaced apart by a distance such that each electrode is disposed adjacent to but spaced from a different face of the partition 5. Electrode 15 is provided with a liquid-impervious, acid-resisting sheath 19 which extends from a point adjacent wall 12 of cap 11 to a point spaced from the free tip of the electrode. Electrode 16 is provided with an identical sheath 20. Thus, electrodes 15 and 16 have exposed tip portions 21 and 22, respectively, which portions have equal predetermined areas.

The tip and wall 6 of casing 2 can be considered to be relatively thick, so that the inlet ports 7 and 8 extend within the wall 6. So considered, wall 6 is provided with a pair of grooves 23 and 24 disposed on opposite sides of partition 5 and each aligned with the tip of a different one of the electrodes 15 and 16. The grooves 23 and 24 being relatively narrow, and the ports 7 and 8 being of relatively small diameter, it will be seen that port 7 and groove 23 combine to define a restricted electrolyte path between the exposed tip portion 21 of electrode 15 and the space outside of the casing. A similar restricted electrolyte path is provided for the exposed tip portion 22 of electrode 16 by the combination of port 8 and groove 24.

At least the tip portion of casing 2 has a transverse dimension such that it may be freely inserted through the vent or filling opening of the storage battery cell to be tested. When the probe is so inserted, it will be understood that the electrolyte within the cell enters via ports 7 and 8 and rises to a level within chambers 3 and 4 such that electrode tip portions 21 and 22 are completely submerged in the electrolyte, but gas outlet ports 9 and 10 are above the electrolyte. With the probe so inserted in the storage battery cell, and with a current source connected across the electrodes, current flows between the electrodes via a closed path including the electrolyte in port 7 and groove 23, the main body of the electrolyte in the cell, and the electrolyte in groove 24 and port 8. With the battery tester in operation as described in said copending application Serial Number 19,573, such current flow will cause hydrogen gas to evolve on the surface of exposed tip portion 21 of the negative electrode 15. If the device is to provide desired accuracy, the hydrogen gas must evolve in the form of bubbles which are relatively uniform in size and which reside on the exposed portion of the electrode for substantially the same length of time. The size and residence time of the bubbles on the exposed portion of the electrode is affected both by the nature of the electrode surface and by the disposition of the electrode with respect to the surrounding chamber walls. Thus, operation of the device can be adversely affected either by a change in the electrode surface, as will result from a crack, for example, or by bodily shifting of the electrode toward or away from one of the chamber walls, such as the adjacent face of partition 5. In connection with the latter point, it is to be noted that the electrodes are supported only at their ends adjacent cap 11, being otherwise completely free from the casing.

We have found that the surface characteristics and the physical dispositions of positive electrode 16 are much less critical than in the case of the negative electrode. Accordingly, it is practical to make electrode 16 of a strip of an alloy predominantly comprising lead. Advantageously, the positive electrode body may be formed of an alloy consisting of 94% lead and 6% antimony.

We have found it to be distinctly advantageous, however, to make the negative electrode 15 in a different manner so as to provide the negative electrode with greater stiffness and with a uniform continuous matte surface. Thus, in accordance with the method of the invention, there is first provided a core strip 25 of relatively stiff brass. After thorough cleaning, this core strip is heavily plated with alimental lead to provide a lead sheath 26 which extends completely over the surface of the core strip, including the free tip thereof. Sheath 26 can be applied to the core strip by conventional electroplating procedures. The surface of the lead-plated electrode body so provided is then thoroughly cleaned, as with a hot caustic solution. The surface of the electrode body is then converted to matte condition. That is, a continuous, irregular surface is provided which is made up of extremely fine lead particles of substantially uniform size and shape. This is accomplished by immersing the cleaned electrode body, as a negative electrode, in a saturated aqueous solution of lead sulfate acidified with concentrated sulfuric acid, also immersing in said solution, as a positive electrode, a like body of lead or lead alloy, and passing current through the solution between the electrodes so as to plate additional lead, in matte form, uniformly on the surface of the negative electrode body. Advantageously, this is done by first assemblying the probe completely, with negative electrode 15 lacking the matte surface, then inserting the probe into the acidified lead sulfate solution, with the solution entering via ports 7 and 8 and covering exposed electrode portions 21 and 22, and then connecting pins 17 and 18 to a source of direct current, with electrode 15 being negative.

The electrode so made has an advantage of being relatively stiff so that, when assembled in the probe as negative electrode 15, the electrode will remain in substantially fixed position with respect to the surrounding chamber walls and will not be caused to crack or otherwise deform when the probe is subjected to mechanical shocks. The fine, uniform matte surface of lead which extends throughout exposed tip portion 21 of the negative electrode assures that the bubbles of hydrogen gas forming on tip portion 21 during use of the device will be of uniform size. Since the bubbles are uniform and since the physical disposition of the negative electrode within its chamber remains substantially unchanged, all of the bubbles will have substantially the same residence time on tip portion 21. While it is not essential to do so, it is to be understood that positive electrode 16 can be made in the same manner hereinbefore described for the negative electrode.

The purpose of covering sheaths 19 and 20 on the electrodes is to make certain that only a predetermined surface area of each electrode will be in contact with the cell electrolyte throughout the conductivity test. We have found that, if such sheaths are not employed, the elecrolyte tends to progressively wet the electrodes so that, after insertion of the probe in the cell, the surface area of the electrodes in contact with electrolyte gradually increases, a phenomenon which obviously would advantageously affect the test. The sheaths 19 and 20 extend sufficiently far along the electrode bodies to make certain that the initial level of the electrolyte, with the probe properly inserted in the cell, is well above the tips of the sheaths. Thus, during use of the probe, the progressive wetting is of the sheath and not of the electrically active part of the electrode. Advantageously, the sheaths 19 and 20 are formed of polyvinyl chloride tubing, the tubing being first dilated, the electrode then inserted, and the tubing being shrunk firmly in place. With the sheaths applied in this fashion, they embrace the surface of the electrode body so tightly as to exclude electrolyte.

It is to be understood that the embodiment of the invention shown and described has been chosen for illustrative purposes and that various changes and modifications can be made without departing from the scope of the invention as defined in the appended claims.

What is claimed is:

1. In a conductivity probe for a tester for determining the condition of a multi-cell storage battery by comparing the conductivities of the individual cell electrolytes, the combination of an elongated hollow casing adapted to be inserted through a filling opening of the battery to be tested, said casing having a pair of chambers extending to the tip thereof, said chambers each being provided with a lateral opening adjacent the tip of said casing to admit battery electrolyte to the chamber, said casing having gas outlet means spaced from the tip of said casing to allow discharge of gas formed within the casing during conductivity measurement; a pair of elongated metal electrodes carried by said casing, each of said electrodes extending within a different one of said chambers and having an exposed tip portion spaced from the walls thereof, said tip portion of one of said electrodes having a uniform continuous matte surface of lead, and means carried by said casing for electrically connecting said electrodes to the circuit of the battery tester in such manner that said one electrode is the negative electrode of the probe, said matte surface being effective to render uniform the formation and release of gas bubbles in said one electrode when current is passed between said electrodes during conductivity measurement.

2. A conductivity probe in accordance with claim 1 and wherein said one electrode comprises a stiff metal core bearing a continuous coating of metallic lead, said continuous matte surface constituting the entire surface of said one electrode exposed for contact with the electrolyte, and said core being effective to minimize cracking of said coating of metallic lead.

3. A conductivity probe in accordance with claim 1 and wherein said electrodes are covered by a liquid-impervious protective barrier except in said exposed tip portions.

4. A conductivity probe in accordance with claim 3 and wherein, for each electrode, said protective barrier is a continuous layer of acid-resistant synthetic resin material.

5. In a conductivity probe for a tester for determining the condition of a multi-cell storage battery by comparing the conductivities of the individual cell electrolytes, the combination of an elongated casing of such width as to be insertable through the filling opening of a storage battery cell, said casing defining a pair of elongated chambers arranged side-by-side, each of said chambers being provided with an opening at the tip of the casing to admit battery electrolyte; a positive electrode disposed in one of said chambers; a negative electrode disposed in the other of said chambers, said negative electrode being spaced from the walls of the chamber in which it is disposed and comprising an elongated core strip of stiff metal and a continuous coating of metallic lead carried by said core strip, said coating having a continuous matte exposed surface, and means carried by said casing for electrically connecting said electrodes to the circuit of the battery tester, said matte surface being effective to render uniform the formation and release of gas bubbles at said negative electrode when current is passed between said electrodes during conductivity measurement.

6. In a conductivity probe for a tester for determining the condition of a multi-cell storage battery by comparing the conductivities of the individual cell electrolytes, the combination of an elongated casing body of electrically nonconductive material, said body being of such width as to be insertable through the filling opening of a storage battery cell and defining a pair of elongated chambers arranged side-by-side, said body being provided at its tip with a pair of openings each communicating with a different one of said chambers for admission of battery electrolyte, said chambers being open at the end of said body opposite said tip; a closure member sealed to the end of said body opposite said tip; a positive electrode and a negative electrode each mounted on said closure member and each extending within a different one of said chambers to a point adjacent the tip of said body, said negative electrode being spaced from the walls of the chamber in which it is disposed and comprising an elongated core of stiff metal and a continuous coating of metallic lead carried by said core, said coating having a continuous matte exposed surface; a pair of sheaths of acid-resistant synthetic resin material, each of said sheaths embracing a different one of said electrodes and extending from a point adjacent said closure member to a point spaced from the tip of the electrode which it embraces, said electrodes having exposed tip portions of predetermined surface area projecting beyond said sheaths; and means carried by said closure member for electrically connecting said electrodes to the circuit of the battery tester.

References Cited in the file of this patent

UNITED STATES PATENTS

| | | |
|---|---|---|
| 1,373,951 | Cox et al. | Apr. 5, 1921 |
| 2,709,781 | Douty et al. | May 31, 1955 |
| 2,888,640 | Eckfeldt et al. | May 26, 1959 |